Jan. 30, 1968    O. G. FOSTER    3,365,783
METHOD OF REPLACING A CLUTCH GEAR BEARING
Filed Sept. 28, 1965    2 Sheets-Sheet 1

INVENTOR
OWELL G FOSTER

BY *Hyatt Dowell &*
*Hyatt Dowell Jr*
ATTORNEYS

Jan. 30, 1968  O. G. FOSTER  3,365,783
METHOD OF REPLACING A CLUTCH GEAR BEARING
Filed Sept. 28, 1965  2 Sheets-Sheet 2
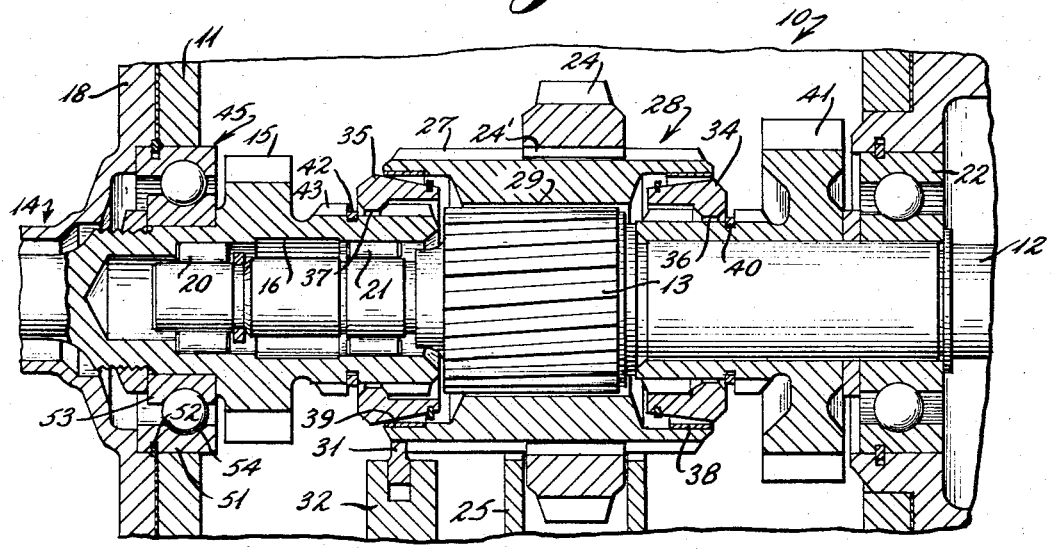
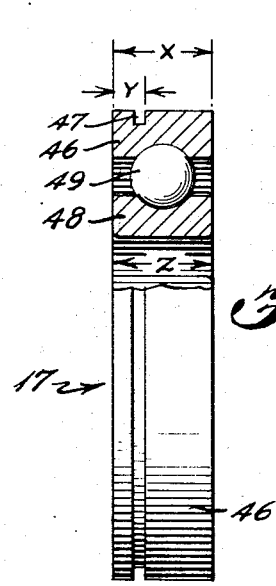
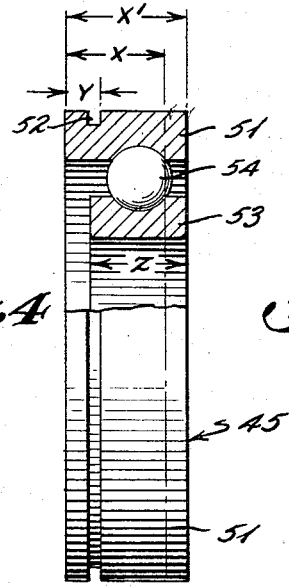
INVENTOR
OWELL G. FOSTER
BY
ATTORNEYS United States Patent Office 3,365,783
Patented Jan. 30, 1968

3,365,783
METHOD OF REPLACING A CLUTCH GEAR BEARING
Owell G. Foster, P.O. Box 111, Bowdon, Ga. 30624
Filed Sept. 28, 1965, Ser. No. 490,821
1 Claim. (Cl. 29—401)

ABSTRACT OF THE DISCLOSURE

Method for altering the relative positions of drive transmitting members in a vehicle transmission, the method including replacing a bearing for moving a clutch gear assembly a greater distance into the transmission housing after certain of the drive means have become worn.

---

This invention relates to the transmission of force from a driving member to a driven member through selectively engageable reduction gearing as well as a method for extending the useful life and efficiency of the various elements of such gearing.

The invention relates particularly to the transmission of force from the engine or power plant of an automotive vehicle to the driving wheels through suitable transmission and differential mechanisms when the vehicle has a mechanically operated gear shift for controlling the gear ratio of the transmission as well as to structure by which the useful life of the various elements of the transmission are prolonged or extended.

Heretofore, some automobiles have been provided with a clutch mechanism and a manually operated transmission to vary the ratio of power and speed which is transmitted from the internal combustion engine to the driving wheels. Most manually operated or standard transmissions for passenger type automobiles have three forward speeds and one reverse speed which can be selectively engaged when the transmission is declutched from the engine. After the automobile has been driven a substantial distance, frictional wear on the cooperating gears increases the tolerances and decreases the efficiency of the transmission to such an extent that the transmission requires extensive repairs and replacement which are both expensive and time consuming.

It is an object of the invention to provide a method of replacing a clutch gear bearing for a transmission which can be easily and quickly applied and which will alter the relative positions of one or more pairs of cooperating gears so that substantially unused portions of such gears will mesh and such gears will not have to be replaced.

Another object of the invention is to provide a replacement clutch gear bearing having portions which are larger than standard clutch gear bearings and which can be applied in a minimum of time with minimum effort by relatively unskilled labor.

Figure 1:
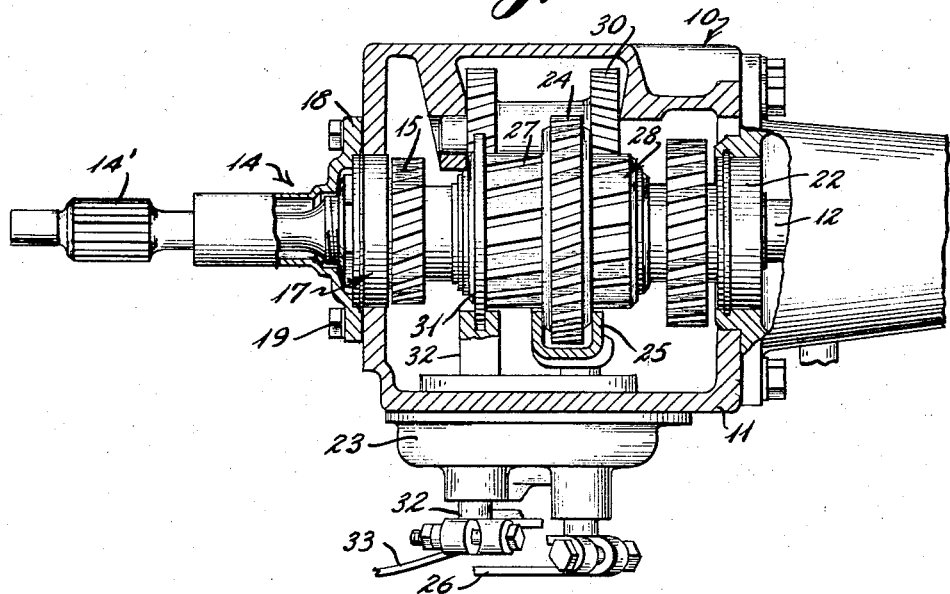
Figure 2:
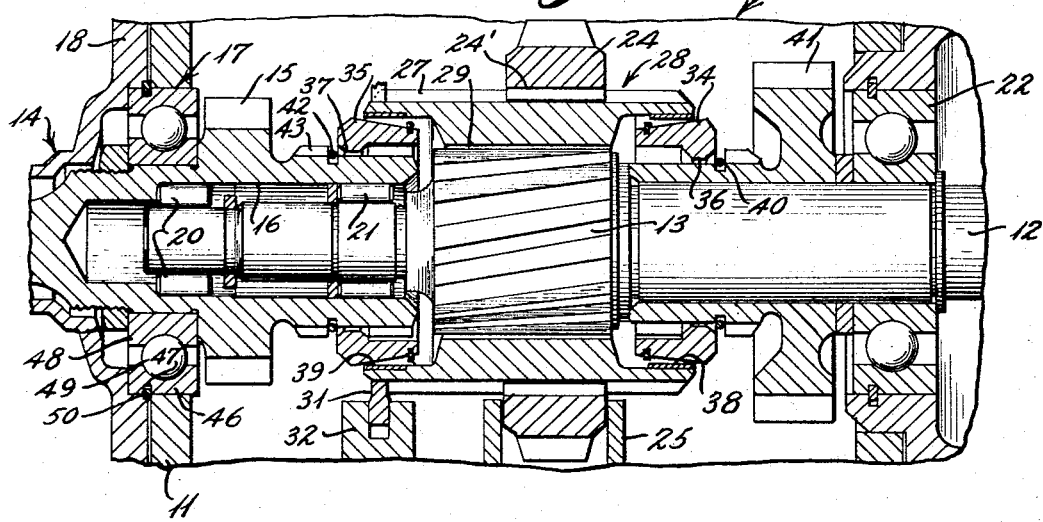

Other objects and advantages of the invention will be apparent from the following description taken in conjunction with the accompanying drawings in which:

FIG. 1 is a side elevation of a standard prior art transmission with portions broken away for clarity;

FIG. 2, an enlarged fragmentary section of the transmission of FIG. 1;

FIG. 3, a view similar to FIG. 2 with the replacement bearing of the present invention applied thereto and illustrating one application of the invention;

FIG. 4, an enlarged side elevation of a conventional prior art clutch gear bearing with portions broken away; and, FIG. 5, a view similar to FIG. 4 illustrating the replacement clutch gear bearing of the present invention.

Briefly stated the present invention is a replacement clutch gear bearing which can be applied to the standard manually operated synchromesh transmission of an automotive vehicle to alter the relative positions of one or more pairs of cooperating gears and drive the mainshaft from the engine of the vehicle and thereby extend the useful life of such gears by moving the clutch gear assembly rearwardly toward the mainshaft.

With continued reference to the drawings, a three-speed synchromesh transmission 10 (FIGS. 1 and 2) is used as standard equipment on many passenger automobiles. This transmission incorporates all helical gears which are machined from drop forged steel gear blanks, heat treated and shot peened for strength and long life. The shafts are machined from high grade steel, heat treated and ground to close limits.

The transmission 10 includes a housing or casing 11 supported by the frame of the automobile. A mainshaft 12 extends into the housing 11 and such mainshaft has a longitudinally splined enlargement 13 integrally formed thereon adjacent to one end. The opposite end of the mainshaft 12 (not shown) is joined by a universal connection to the drive shaft which transmits driving force through the differential to the drive wheels of the automobile. A clutch gear assembly 14 is disposed at the opposite end of the housing 10 and such assembly has an integral clutch gear 15 and a hollow bore 16. The clutch gear assembly 14 is supported by a heavy duty ball bearing 17 which is retained in position by a clutch gear bearing retainer 18 mounted on the housing 11 by fasteners 19. The front end portion of the clutch gear assembly 14 has a splined enlargement 14' which meshes with a pedal-operated clutch (not shown). The front end of the mainshaft is piloted in a double row of roller bearings 20 and 21 set in the hollow bore 16 of the clutch gear assembly and the rear end is carried by a rear bearing 22.

Gearshifting is manually accomplished through a concentric gearshift mechanism (not shown) which is connected to the transmission cover 23 located on the side of the transmission. A first and reverse sliding gear 24, shown in neutral position, is adapted to be moved selectively by a shifter fork 25 connected by a control rod 26 to the gearshift mechanism. The gear 24 has internal teeth 24' which are slidably mounted within external splines 27 of a clutch sleeve 28 and such clutch sleeve has internal teeth 29 meshing with the splined enlargement 13 of the mainshaft to provide a driving connection thereto. Movement of the shifter fork 25 in one direction will cause the sliding gear 24 to engage a reverse idler gear 30 which is driven by a counter-gear assembly (not shown) to move the automobile in reverse at a gear ratio of approximately 2.94 to 1. Movement of the shifter fork 25 in the opposite direction will cause the sliding gear 24 to engage a first speed gear ratio (not shown) to move the vehicle in a forward direction at a gear ratio of approximately 2.94 to 1.

A clutch sleeve ring 31 is fixed to the clutch sleeve 28 and is engaged by a shifter fork 32 connected by a control rod 33 to the gearshift mechanism. Synchronizer rings 34 and 35 having inwardly extending lugs 36 and 37 respectively are mounted in counterbores 38 and 39 in opposite ends of the clutch sleeve 28. Movement of the shifter fork 32 in one direction will move the synchronizer ring 34 past an energizing spring 40 to drivingly engage a second speed gear 41 and drive the vehicle at a gear ratio of approximately 1.68 to 1. Movement of the shifter fork 32 in the opposite direction will move the synchronizer ring 35 past an energizing spring 42 to drivingly engage a third speed gear by meshing the third speed gear 43 and the clutch sleeve 28, internal teeth 29 and drive the vehicle at a ratio of 1 to 1.

The above structure is old and well known in the art. Since most of the driving of the automobile will be while the vehicle is in third gear, after the vehicle has been driven a substantial distance the teeth of the third speed gear 43 and the clutch sleeve 28, internal teeth 29 become worn through friction and the clutch sleeve 28 and internal teeth 29 slip off third speed teeth 43 into neutral position. When this condition occurs, it has been the practice to overhaul the transmission and replace the clutch gear assembly 14, and the clutch sleeve 28, and any other part that has begun to wear. This has entailed a large expense both in labor and in replacement parts.

The present invention is a replacement clutch gear bearing 45, FIGS. 3 and 5, which will replace ball bearing 17 when the worn condition exists and will alter the position of the clutch gear assembly 14 and the third speed gear 43 relative to the mainshaft 12 and the clutch sleeve 28 so that the clutch teeth 29 will engage the teeth of the third speed gear 43 in an unused area. FIG. 4 illustrates a conventional prior art ball bearing having an outer race 46 of a predetermined width X and having a groove 47 spaced a predetermined distance Y from the front of the bearing. An inner race 48 is provided having a predetermined width Z which may or may not be the same width as the outer race 46, such inner and outer races being separated by a plurality of balls or other anti-friction means 49. A snap ring 50 is located in the groove 47 for positioning the ball bearing 17 and the clutch gear assembly 14 within the housing 11.

In order to change the relative positions of the clutch gear assembly 14 and the mainshaft 12, the replacement clutch gear bearing 45, FIGS. 3 and 5, has an outer race 51 of a width X' substantially wider than the width of the conventional bearing outer race 46. A groove 52 is spaced from the front of the outer race 51 substantially the same distance Y as the groove 47 in the outer race 46. An inner race 53 is separated from the outer race 51 by a plurality of balls or other anti-friction means 54 and if desired such inner race may be of substantially the same width Z as the inner race 48.

In the use of the device, when the clutch teeth 29 begin slipping off of the third speed gear, the transmission 10 is removed from the vehicle after which the clutch gear bearing retainer 18 can be taken off by removing fasteners 19. The clutch gear assembly 14 then is removed and the ball bearing 17 is pressed off using an arbor press. The replacement clutch gear bearing 45 is pressed onto the clutch gear assembly 14 and such assembly is reassembled in the transmission 10. Due to the length of the outer race 51, the inner end of the clutch gear assembly 14 extends inwardly a greater distance than previously so that when the clutch sleeve 28 is moved forwardly, the clutch teeth 29 will extend onto the unworn portions of the third speed gear 43.

It will be apparent that by using the replacement clutch gear bearing of the present invention, a major overhaul and replacement of many expensive parts is avoided and simultaneously the efficiency and useful life of the transmission are greatly increased.

It will be obvious to one skilled in the art that various changes may be made in the invention without departing from the spirit and scope thereof and therefore the invention is not limited by that which is illustrated in the drawings and described in the specification, but only as indicated in the accompanying claims.

I claim:

1. A method of repairing a vehicle transmission having a housing with a clutch gear assembly supported therein by an original bearing and retained therein by a bearing retainer, and a gear driving connection mounted on said clutch gear assembly in predetermined relationship with a clutch sleeve within said housing, said clutch sleeve and said gear driving connection being selectively drivingly connectable with each other, comprising the steps of: removing said bearing retainer from said housing, withdrawing said clutch gear assembly and said original bearing from said housing, removing said original bearing from said clutch gear assembly, replacing said original bearing with a replacement bearing having an outer race which is wider than the outer race of the original bearing, re-inserting said clutch gear assembly within said housing with the gear driving connection located in a different position relative to the clutch sleeve and replacing said clutch gear bearing retainer, whereby the gear driving connection will engage said clutch gear in a different position when such gears are in engagement.

References Cited

UNITED STATES PATENTS

| | | | |
|---|---|---|---|
| 2,051,704 | 8/1936 | Harris | 308—236 |
| 3,292,446 | 12/1966 | Scofield et al. | 74—333 |

DONLEY J. STOCKING, *Primary Examiner.*

H. S. LAYTON, *Assistant Examiner.*